(12) United States Patent
Wakayama et al.

(10) Patent No.: US 7,548,193 B2
(45) Date of Patent: Jun. 16, 2009

(54) RADAR DEVICE

(75) Inventors: Toshio Wakayama, Tokyo (JP);
Masashi Mitsumoto, Tokyo (JP);
Naohisa Uehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 30 days.

(21) Appl. No.: 11/872,252

(22) Filed: Oct. 15, 2007

(65) Prior Publication Data

US 2009/0021421 A1    Jan. 22, 2009

(30) Foreign Application Priority Data

Jul. 19, 2007    (JP)    ............... 2007-188626

(51) Int. Cl.
*G01S 7/292*    (2006.01)
*G01S 13/95*    (2006.01)

(52) U.S. Cl. ............... 342/194; 342/196; 342/26 R; 342/192

(58) Field of Classification Search ...... 342/26 R–26 D, 342/192, 194–196
See application file for complete search history.

(56) References Cited

U.S. PATENT DOCUMENTS

| | | | | |
|---|---|---|---|---|
| 4,717,916 A | * | 1/1988 | Adams et al. ............... | 342/107 |
| 5,027,122 A | * | 6/1991 | Wieler ............... | 342/26 D |
| 5,831,570 A | * | 11/1998 | Ammar et al. ............... | 342/26 B |
| 6,081,220 A | * | 6/2000 | Fujisaka et al. ............... | 342/26 D |
| 6,894,638 B2 | * | 5/2005 | Matsuda et al. ............... | 342/26 R |
| 7,372,394 B1 | * | 5/2008 | Woodell et al. ............... | 342/26 R |
| 7,460,063 B2 | * | 12/2008 | De Maagt et al. ............... | 342/351 |
| 2005/0035894 A1 | * | 2/2005 | Dean et al. ............... | 341/155 |
| 2008/0074307 A1 | * | 3/2008 | Boric-Lubecke et al. ...... | 342/28 |
| 2008/0150795 A1 | * | 6/2008 | Wakayama et al. ......... | 342/196 |

FOREIGN PATENT DOCUMENTS

JP    02194388 A    *    7/1990

OTHER PUBLICATIONS

U.S. Appl. No. 11/870,106, filed Oct. 10, 2007, Toshio Wakayama, et al.
Richard J. Doviak, et al., "Doppler Radar and Weather Observation", 3. Radar and It's Environment, Second Edition, Academic Press, Inc., 1993, pp. 30-53 and 2 cover pages.
Merrill Ivan Skolnik, "Introduction to Radar Systems", McGraw-Hill Higher Education, Chapter 9, Third Edition, 2001, pp. 610-615 and cover page.

* cited by examiner

*Primary Examiner*—John B Sotomayor
(74) *Attorney, Agent, or Firm*—Oblon, Spivak, McClelland, Maier & Neustadt, P.C.

(57) ABSTRACT

For enabling determination on whether a sign of a Doppler frequency or a target angle is positive or negative even when only a real signal can be obtained as a received signal, the present invention provides a radar device including: an oscillator; a transmitting element; a distributor; receivers using the local wave to detect the received wave to generate a real received signal; a plurality of inter-channel phase correcting units; a spatial frequency information generating unit for converting a received signal string obtained by gathering a plurality of phase-corrected received signals into a signal in a spatial frequency domain; and a sign selecting unit for selecting a signal having a larger amplitude in a spatial frequency spectrum when two signals from a positive direction and a negative direction which are symmetrical with respect to a direction at approximately 0 degree.

11 Claims, 10 Drawing Sheets

RADAR DEVICE

BACKGROUND OF THE INVENTION

1. Field of the Invention

The present invention relates to a radar device for emitting a wave into space, receiving the wave reflected by an object present in the space, and performing signal processing on the received wave to measure the object.

2. Description of the Related Art

Generally, a radar emits an electromagnetic wave into space and receives the electromagnetic wave reflected by a target present in the space to know the presence/absence of the target, specifically, to detect the target. When the target moves relative to the radar, measurement of a frequency shift caused by a Doppler effect, specifically, measurement of a Doppler frequency also allows measurement of a relative velocity of the target, specifically, a Doppler velocity.

For the measurement of the Doppler frequency, an I/Q detection system for obtaining two orthogonal signal components as received signals is generally used. According to this detection system, each of a received wave and a local wave is divided into two to prepare two combinations of the received wave and the local wave. For each combination, the received wave and the local wave are mixed by using a mixer to obtain received signals in two channels. The two received signal channels are referred to as In-phase channel (I-channel) and Quadrature-phase channel (Q-channel), respectively.

For obtaining the Q-channel received signal of the received signals in two channels, a phase of any of the received wave and the local wave is rotated by 90 degrees. As a result, orthogonal components between the I-channel and the Q-channel are obtained. By performing a Fourier transform on a complex received signal obtained by regarding the I-channel as a real part and the Q-channel as an imaginary part, an amplitude of a frequency corresponding to a target Doppler frequency becomes larger. As a result, the target Doppler frequency can be obtained (for example, see "3. Radar and Its Environment" by R. J. Doviak and D. S. Zrnic, in Doppler Radar and Weather Observations, Second Ed., p. 30-53, Academic Press, Inc., 1993.).

When the received signal is obtained only for one channel, specifically, only for the I-channel, the received signal is a real signal. In this case, the Fourier transform of the received signal provides an amplitude distribution symmetrical about a frequency of 0. Therefore, even if the target Doppler frequency is positive, the amplitude becomes larger at two points, one of which is in a positive frequency and the other is in a negative frequency (the amplitude has two peaks in the frequency), after the Fourier transform. On the contrary, even if the target Doppler frequency is negative, the amplitude similarly becomes larger at two points, one of which is in the positive frequency and the other is in the negative frequency. Specifically, even if an absolute value of the Doppler frequency is obtained, a sign of the absolute value cannot be determined. Therefore, the sign of the Doppler frequency remains ambiguous. The ambiguous sign of the Doppler frequency means impossibility in determining whether the target is approaching or receding.

Similar ambiguity in the sign of the frequency also appears in a radar using a digital beam forming (DBF) system corresponding to a technique of synthesizing received beams through signal processing. In the DBF system, received signals obtained from a plurality of received elements are subjected to the Fourier transform in an element direction to obtain a signal distribution in an angular direction. Specifically, the DBF system is a technique of synthesizing the received beams through the signal processing (for example, see M. I. Skolnik, Introduction to Radar Systems, Third Ed., pp. 610-614, McGraw-Hill, 2001).

In such a DBF-system radar, when the received signal is obtained only for one channel, specifically, only a real received signal is obtained, an amplitude pattern of a received beam obtained by performing the Fourier transform on the received signal is symmetrical on a positive angle side and a negative angle side with a front direction defined as 0 degree. Specifically, it is uncertain whether an incoming angle of the received wave is positive or negative.

As described above, in the Doppler radar, when only a real signal (only for the I-channel) can be obtained as the received signal, the sign of the Doppler frequency cannot be obtained. Furthermore, when a DBF-system antenna is used, information indicating whether a target angle (defining the front direction as 0 degree) is positive or negative cannot be obtained. However, if a radar device is composed of the I-channel alone, the number of components advantageously becomes less than in the case where the radar device is composed of two channels, i.e., the I-channel and the Q-channel. Therefore, the radar device can be reduced in size as well as in cost.

SUMMARY OF THE INVENTION

The present invention has been made to solve the above-mentioned problem of incompatibility between ambiguity in sign and a reduction in size and cost, and has an object of providing a radar device capable of determining a sign of a Doppler frequency or a sign of a target angle as positive or negative even when only a real signal can be obtained as a received signal.

According to an aspect of the present invention, there is provided a radar device for emitting a wave into space, receiving the wave reflected by an object present in the space, and performing signal processing on the received wave to measure the object, including: an oscillator for generating the wave; a transmitting element for emitting the wave generated in the oscillator into the space; a local wave extracting unit for extracting a part of the wave generated in the oscillator to output the part of the wave as a local wave; a plurality of receiving elements provided at positions different from each other, for receiving an incoming wave and outputting the received wave; a plurality of receivers each using the local wave output from the local wave extracting unit to detect the received wave received by each of the plurality of receiving elements to generate a real received signal; a plurality of inter-channel phase correcting units for multiplying the real received signal obtained by each of the plurality of receivers by a phase correction factor different for each of the plurality of receivers, the phase correction factor being represented by a complex number; a spatial frequency information generating unit for converting a received signal string obtained by gathering phase-corrected received signals output from the plurality of inter-channel phase correcting units into a signal in a spatial frequency domain; and a sign selecting unit for selecting a signal having a larger amplitude in a spatial frequency spectrum when two signals from a positive direction and a negative direction which are symmetrical with respect to a direction at 0 degree are detected in the spatial frequency information generating unit.

According to the present invention, even when only a real signal can be obtained as a received signal, it can be determined whether the sign of the Doppler frequency or the target angle is positive or negative.

DETAILED DESCRIPTION OF THE PREFERRED EMBODIMENTS

First Embodiment

Figure 1:
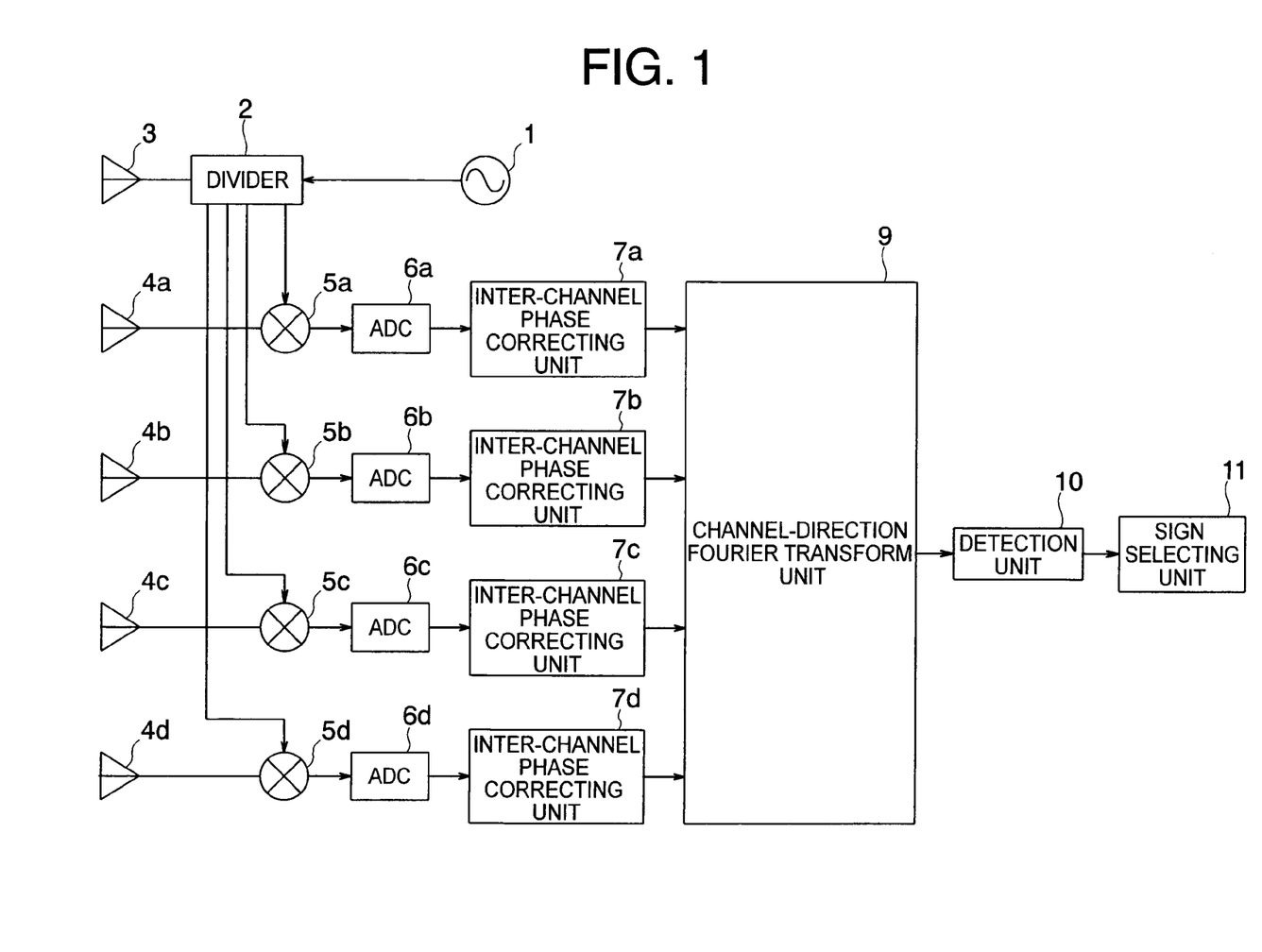
FIG. 1 is a block diagram illustrating a configuration of a radar device according to a first embodiment of the present invention.

FIG. 1 is a block diagram illustrating a configuration of a radar device according to a first embodiment of the present invention. The radar device illustrated in FIG. 1 includes an oscillator 1, a divider 2, a transmitting antenna 3, a plurality of receiving antennas 4a to 4d, a plurality of receivers 5a to 5d, a plurality of A/D converters 6a to 6d, and a plurality of inter-channel phase correcting units 7a to 7d. The oscillator 1 generates a transmission wave (wave). The divider 2 serves as a local wave extracting unit which divides the transmission wave output from the oscillator 1 to extract a part of the transmission waves obtained by the division as a local wave. The transmitting antenna 3 serves as a transmitting element. One of the transmission waves output from the divider 2 is input to the transmitting antenna 3, which in turn emits the transmission wave into space. The plurality of receiving antennas 4a to 4d are receiving elements located at the positions different from each other. Each of the receiving antennas 4a to 4d receives a reflected wave generated by the transmission wave reflected by an object present in the space to obtain a received wave. The received wave is input from each of the receiving antennas 4a to 4d to the corresponding one of the receivers 5a to 5d where the received wave is mixed with the output of the transmission wave input from the divider 2 to generate a real received signal. Each of the A/D converters 6a to 6d performs analog-to-digital (AD) conversion on the received signal output from the corresponding one of the plurality of receivers 5a to 5d to generate a digital received signal. Each of the inter-channel phase correcting units 7a to 7d corrects a variation in phase between the channels (hereinafter, also referred to as an inter-channel phase variation) for the digital received signal to generate a phase-corrected received signal. Each of the inter-channel phase correcting units 7a to 7d multiplies the real received signal from each of the receivers 5a to 5d by a phase correction factor represented by a complex number, which is different for each receiver.

The radar device also includes a channel-direction Fourier transform unit 9, a detection unit 10, and a sign selecting unit 11. The channel-direction Fourier transform unit 9 performs a Fourier transform on the phase-corrected received signal output from each of the inter-channel phase correcting units 7a to 7d. A channel-direction Fourier-transformed signal is input from the channel-direction Fourier transform unit 9 to the detection unit 10, which in turn detects a spatial frequency having a larger amplitude. The sign selecting unit 11 extracts only the result of detection of the angle with a correct sign from those detected in the detecting unit 10. The channel-direction Fourier transform unit 9 functions as a spatial frequency information generating unit which converts a received signal string obtained by gathering the phase-corrected received signals output from the plurality of inter-channel phase correcting units 7a to 7d into a signal in a spatial frequency domain. When signals from two directions corresponding to a negative direction and a positive direction, which are symmetrical with respect to a direction at approximately 0 degree, are detected in the detection unit 10, the sign selecting unit 11 selects the signal having a larger amplitude in a spatial frequency spectrum.

Next, an operation of the radar device according to the first embodiment will be described. The oscillator 1 generates a transmission wave. A transmission frequency band frequently used in the radar device is a microwave band or a millimeter wave band. In the present invention, however, a transmission frequency of the radar device is not particularly limited. Hereinafter, the description will be given on an assumption that the transmission wave is a radio wave. However, the present invention is similarly applicable to the use of a laser beam which is a kind of electromagnetic wave, specifically, to a laser radar. Furthermore, the application of the present invention is not limited to the radar using the electromagnetic wave. The present invention is also applicable to a radar using a sonic wave (SODAR).

As the transmission wave output from the oscillator 1, an unmodulated continuous wave is herein assumed. In the present invention, however, a method of modulating the transmission wave is not particularly limited. The present invention is also applicable to a radar device employing an arbitrary modulating method such as pulse modulation or frequency modulation.

The transmission wave generated in the oscillator 1 is input to the divider 2. The divider 2 divides the transmission wave into multiple transmission waves and outputs the obtained transmission waves. One of the transmission wave outputs obtained by the division is output to the transmitting antenna 3. The other transmission wave outputs are output to the receivers 5a to 5d as local waves.

When a transmission frequency of the transmission wave is $f_c$, an initial phase of the transmission wave at an output terminal of the divider 2 is $\phi_o$, and an amplitude of the transmission wave is $A_t$, it is assumed that a time waveform $s_o(t)$ of the transmission wave at the output terminal of the divider 2 is expressed by the following Formula (1).

[Formula 1]

$$s_0(t) = A_t \cos(2\pi f_c t + \phi_0) \quad (1)$$

The transmitting element 3 emits the transmission wave input from the divider 2 into space. The emitted transmission wave is reflected by a reflecting object present in the space. A part of the resultant reflected wave returns to the position of the radar device. The reflected wave reaching the position of the radar is captured by the radar device through the receiving elements 4a to 4d. Herein, the reflected wave captured by each of the receiving elements 4a to 4d is referred to as a received wave.

The receiving elements 4a to 4d are provided at different spatial positions. As a result, a phase difference depending on an incoming direction of the reflected wave is generated in the received wave received by each of the receiving elements 4a to 4d. For example, assuming that the receiving elements 4a to 4d are linearly arranged on an X-axis at equal intervals and the position of ach of the receiving elements 4a to 4d is represented by $X_m$, the received wave input to the receiving element is expressed by the following Formula (2).

[Formula 2]

$$s_{r0,m}(t) = A_r \cos\left(2\pi(f_c + f_b)t + \frac{2\pi(f_c + f_b)}{c} x_m \sin\theta_T - 2\pi(f_c + f_b)\frac{l_t}{c} + \psi_T + \phi_0\right) \quad (2)$$

where $f_b$ is a Doppler frequency, $\theta_T$ is an angle at which a reflecting object is present when viewed from the radar device, $\psi_T$ is a phase angle determined based on a distance between the radar device and the reflecting object and radio wave reflection characteristics of the reflecting object, and $l_t$ is an electrical path length from the divider to the output terminal of the transmitting antenna. The reflecting object approximates an object in a far field. The second term in cos(phase angle) represents a phase difference due to a difference between the positions of the receiving elements, the third term represents the amount of phase rotation due to a time delay generated during the propagation of the transmission wave within the radar device, and the fourth term represents the amount of phase rotation generated during a time from the emission of the transmission wave into the space to the reception of the reflected wave by the receiving element.

The receiving elements 4a to 4d are respectively connected to the receivers 5a to 5d. The received wave obtained in each of the receiving elements 4a to 4d is input to the corresponding one of the receivers 5a to 5d through a power feeding path. The received wave at an input terminal of each of the receivers 5a to 5d is expressed by the following Formula (3).

[Formula 3]

$$s_{ri,m}(t) = A_r \cos\left(2\pi(f_c + f_b)t + \frac{2\pi(f_c + f_b)}{c} x_m \sin\theta_T - 2\pi f_c \frac{l_t + l_{r,m}}{c} + \psi_T + \phi_0\right) \quad (3)$$

where $l_{r,m}$ is an electrical path length of a power feeding line for feeding the received wave from any of the receiving elements 4a to 4d to the corresponding one of the receivers 5a to 5d.

On the other hand, the local wave input to the m-th receiver is expressed by the following Formula (4).

[Formula 4]

$$s_{L,m}(t) = \cos\left(2\pi f_c t - 2\pi f_c \frac{l_{L,m}}{c} + \phi_0\right) \quad (4)$$

where $l_{L,m}$ is an electrical path length of a power feeding path for feeding the local wave from the divider 2 to the corresponding one of the receivers 5a to 5d.

Each of the receivers 5a to 5d mixes the received wave and the local wave to generate a received signal having a frequency corresponding to a difference between the received wave and the local wave (difference frequency). Because the unmodulated continuous wave is assumed as the transmission wave, the difference frequency is equal to a Doppler frequency of the reflecting object. The received signal is expressed by the following Formula (5). In Formula (5), after the multiplication of Formula (3) by Formula (4), a harmonic component is removed from the result of multiplication.

[Formula 5]

$$s_{ro,m}(t) = A_r \cos\left(2\pi f_b t + \frac{2\pi f_c}{c} x_m \sin\theta_T + \psi_0 + \Delta\psi_m\right) \quad (5)$$

In Formula (5), it is supposed that the Doppler frequency $f_b$ is sufficiently smaller than the transmission frequency $f_c$. An initial phase of the received signal is expressed by the sum of the amount common to all the receiving elements 4a to 4d, $\psi_0$, and the amount varied for each of the receiving elements 4a to 4d, $\Delta\psi_m$.

[Formula 6]

$$\psi_0 + \Delta\psi_m = -2\pi f_c \frac{l_t + l_{r,m} - l_{L,m}}{c} + \psi_T \quad (6)$$

Each of the receivers 5a to 5d may include an amplifier as needed. However, the amplifier is not particularly explicitly illustrated in FIG. 1 because the present invention does not limit the system employed by the radar device.

Each of the receivers 5a to 5d outputs the received signal generated therein to the corresponding one of the AD converters 6a to 6d. Each of the AD converters 6a to 6d performs analog-to-digital conversion on the input received signal to generate a digital received signal. An output terminal of each of the AD converters 6a to 6d is connected to an input terminal of the corresponding one of the inter-channel phase correcting units 7a to 7d, to input the digital received signal generated in each of the AD converters 6a to 6d to the corresponding one of the inter-channel phase correcting units 7a to 7d.

Each of the inter-channel phase correcting units 7a to 7d uses a phase correction amount set for each channel to perform a process of correcting the phase varied between the channels on the digital received signal to generate the phase-corrected received signal. The phase correction is performed by multiplying the digital received signal by $\exp(-j\Delta\psi_m)$, as expressed by the following Formula (7).

[Formula 7]

$$s_c(t) = s_{ro,m}(t)\exp(-j\Delta\psi_m) \quad (7)$$
$$= A_r\cos\left(2\pi f_b t + \frac{2\pi f_c}{c}x_m\sin\theta_T + \psi_0 + \Delta\psi_m\right)\exp(-j\Delta\psi_m)$$
$$= \frac{A_r}{2}\left[\exp\left\{j\left(2\pi f_b t + \frac{2\pi f_c}{c}x_m\sin\theta_T + \psi_0 + \Delta\psi_m\right)\right\}\exp(-j\Delta\psi_m) + \right.$$
$$\left.\exp\left\{-j\left(2\pi f_b t + \frac{2\pi f_c}{c}x_m\sin\theta_T + \psi_0 + \Delta\psi_m\right)\right\}\exp(-j\Delta\psi_m)\right]$$
$$= \frac{A_r}{2}\exp\left\{j\left(2\pi f_b t + \frac{2\pi f_c}{c}x_m\sin\theta_T + \psi_0\right)\right\} +$$
$$\frac{A_r}{2}\exp\left\{-j\left(2\pi f_b t + \frac{2\pi f_c}{c}x_m\sin\theta_T + \psi_0 + 2\Delta\psi_m\right)\right\}$$

The first term on the right-hand side in Formula (7) is now equated to $S_{c+}(t)$, whereas the second term on the right-hand side is equated to $S_{c-}(t)$. Specifically,

[Formula 8]

$$s_{c+}(t) = \frac{A_r}{2}\exp\left\{j\left(2\pi f_b t + \frac{2\pi f_c}{c}x_m\sin\theta_T + \psi_0\right)\right\} \quad (8)$$

[Formula 9]

$$s_{c-}(t) = \frac{A_r}{2}\exp\left\{-j\left(2\pi f_b t + \frac{2\pi f_c}{c}x_m\sin\theta_T + \psi_0 + 2\Delta\psi_m\right)\right\} \quad (9)$$

The phase-corrected received signal output from each of the inter-channel phase correcting units 7a to 7d is input to the channel-direction Fourier transform unit 9, which in turn performs a Fourier transform on the phase-corrected received signal in a channel direction. The Fourier transform process performed in the channel-direction Fourier transform unit 9 performs a process of performing coherent integration after compensating for a phase difference between the receiving elements, which is obtained by supposing an incoming direction, in a plurality of supposed incoming directions. Therefore, when the supposed direction of the incoming wave is the same as the direction from which the reflected wave actually comes, an amplitude of the signal becomes large. Therefore, by detecting a peak of the amplitude of the received signal after the channel-direction Fourier transform, the incoming direction can be obtained. The component after the channel-direction Fourier transform in a direction at an angle θ is calculated by the following Formula (10).

[Formula 10]

$$S(\theta) = \sum_{m=1}^{M} s_c(t)\exp\left(-j\frac{2\pi f_c}{c}x_m\sin\theta\right) \quad (10)$$
$$= \sum_{m=1}^{M} s_{c+}(t)\exp\left(-j\frac{2\pi f_c}{c}x_m\sin\theta\right) + \sum_{m=1}^{M} s_{c-}(t)\exp\left(-j\frac{2\pi f_c}{c}x_m\sin\theta\right)$$

The first term on the right-hand side in Formula (10) is now equated to $S_+(\theta)$, whereas the second term on the right-hand side is equated to $S_-(\theta)$. When $\theta=\theta_T$ is established, the phases of the respective terms in Σ of $S_+(\theta)$ become identical with each other. Therefore,

[Formula 11]

$$|S_+(\theta_T)| = \frac{MA_r}{2} \quad (11)$$

is obtained. For $S_-(\theta)$, because the term proportional to $X_m$ remains in the phases of the respective terms in Σ, the phases of the respective terms in Σ are not identical with each other. Therefore, $|S_-(\theta_T)|$ results in a small value, and

[Formula 12]

$$|S(\theta_T)| \cong |S_+(\theta_T)| = \frac{MA_r}{2} \quad (12)$$

is established.

Next, when $\theta=-\theta_T$ is established, the term proportional to $X_m$ is eliminated from the phases of the respective terms in Σ for $S_-(\theta)$. However, since the term with $2\Delta\psi_m$, which is a phase varying for each receiving channel, remains, a variation remains in the phase of $S_-(\theta)$. Specifically,

[Formula 13]

$$|S_-(\theta_T)| = \frac{A_r}{2}\sum_{m=1}^{M}\exp(-2\Delta\psi_m) \quad (13)$$

is established. This Formula implies that the amplitude is reduced by a difference between a factor:

[Formula 14]

$$\left|\sum_{m=1}^{M}\exp(-2\Delta\psi_m)\right| \quad (14)$$

and M, the factor being smaller than M. Specifically, the amplitude is reduced by the amount of incorrectly performed phase correction.

For $S_+(\theta)$, because the term proportional to $X_m$ remains in the phases of the respective terms in Σ, the phases of the respective terms in Σ vary. Therefore, $|S_+(\theta_T)|$ results in a small value. When $\theta\neq\theta_T$ and $\theta\neq-\theta_T$ are both established, the phase term proportional to $X_m$ remains in any of the terms in Σ of $S(\theta)$. Therefore, an amplitude $|S(\theta)|$ results in a small value.

Herein, it is assumed that only I-channel is obtained in each of the receivers 5a to 5d in the radar device according to the present invention, and therefore, the received signal is a real signal. If the Fourier transform is performed on the received signal, the received signal after the Fourier transform has an amplitude symmetrical about a spatial frequency of 0. This symmetry means that the sign of the incoming direction of the reflected wave cannot be obtained.

However, the phase correction in the inter-channel phase correcting units 7a to 7d as described above causes the phase-corrected received signal input to the channel-direction Fourier transform unit 9 to have an imaginary component.

Accordingly, the signal after the channel-direction Fourier transform does not have an amplitude symmetrical about the spatial frequency of 0.

More specifically, the inter-channel phase correction is properly performed only on a spatial frequency component with a correct sign. Because a spatial frequency component with an incorrect sign, which is generated by ambiguity in sign after the Fourier transform, still has a variation in phase as expressed by Formula (10), the effect of coherent integration is reduced. As a result, the frequency component with the correct sign has a larger amplitude after the Fourier transform as compared with the frequency component with the incorrect sign.

Figure 2:
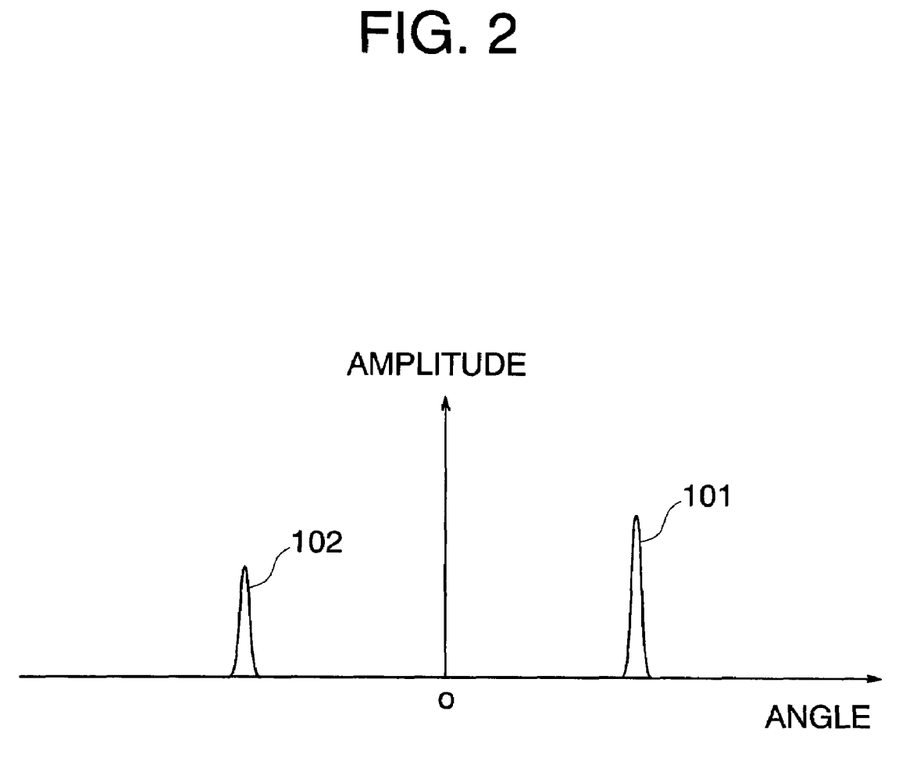
FIG. 2 is a schematic view of a spatial spectrum obtained in the radar device according to the first embodiment of the present invention.

FIG. 2 schematically illustrates the above-described characteristic. In FIG. 2, a peak 101 is obtained at an angle at which the reflecting object is actually present, whereas a peak 102 appears at an angle obtained by reversing the sign of the angle of the peak 101 due to ambiguity in sign. In comparison between the peaks 101 and 102, the peak 102 appearing due to ambiguity in sign has a smaller amplitude than that of the peak 101. Therefore, by selecting the peak having a larger amplitude, the problem of ambiguity in sign of the angle can be solved.

Based on the above-described characteristic, the detection unit 10 and the sign selecting unit 11 are used to extract only a signal with the correct sign from the detected spatial frequencies to remove a signal corresponding to a frequency with the incorrect sign. First, in the detection unit 10, a peak detection process using a threshold value is performed on the amplitude of the channel-direction Fourier transform, which is output from the channel-direction Fourier transform unit 9. Specifically, the angle, at which the amplitude of the channel-direction Fourier transform, i.e., an amplitude spectrum has the maximum value, is extracted. When the amplitude at the extracted angle exceeds a preset threshold value, it is determined that the signal has been detected. Then, the detection unit 10 outputs the combination of the angle and the amplitude as the result of detection.

Due to the ambiguity in sign of the result of detection output from the detection unit 10, however, an erroneous result of detection is sometimes obtained for the angle obtained by reversing the sign of the angle of the correctly detected signal. Therefore, the sign selecting unit 11 checks whether or not the result of detection has also been obtained for the angle obtained by reversing the sign of the angle, for each of the input results of detection. If the result of detection has been obtained for the angle obtained by reversing the sign of the angle, the amplitude detected at the original angle and the amplitude detected at the angle with the reversed sign are compared with each other to eliminate the result of detection having a smaller amplitude. As a result, a false image generated due to ambiguity in sign can be prevented from being detected.

Figure 3:
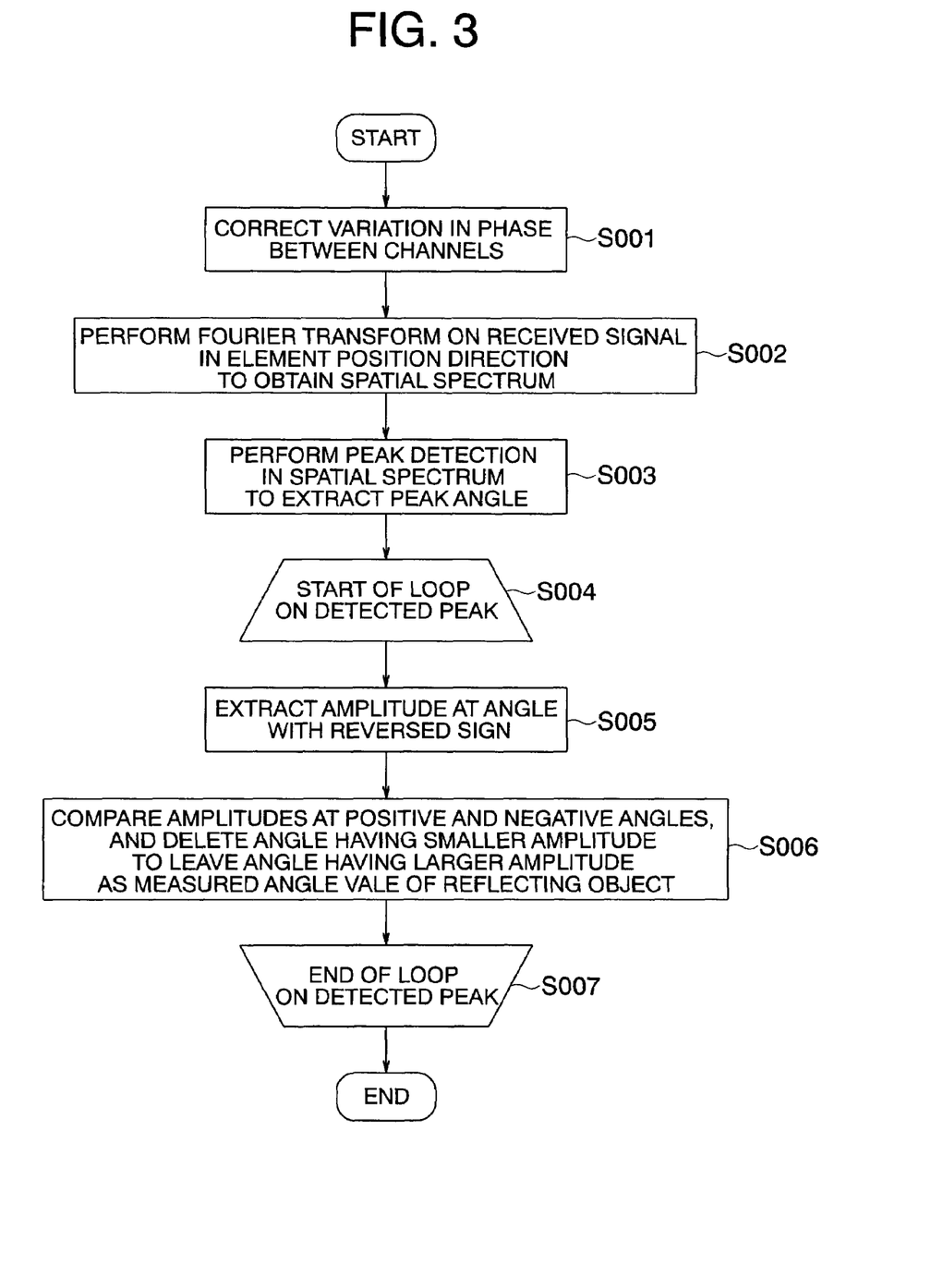
FIG. 3 is a flowchart illustrating an operation of a sign selecting unit in the radar device according to the first embodiment of the present invention.

FIG. 3 is a flowchart of signal processing in the radar device according to this embodiment. In Step s001, the inter-channel phase correcting units 7a to 7d perform a phase correction for compensating for a phase variation between the channels as expressed by Formula (7) on the digital received signals obtained in the AD converters 6a to 6d.

In Step s002, a Fourier transform is performed on each of the phase-corrected received signals in the channel direction in the channel-direction Fourier transform unit 9. In Step s003, the detection unit 10 performs a peak detection process on the amplitude of the channel-direction Fourier transform to extract the angle of the position of the peak.

Steps s004 to s007 constitute a loop for repeating the process for each of the peaks detected in Step s003. First, in Step s005, one of the detected peak angles is extracted. Then, a spatial spectrum amplitude value at the angle obtained by reversing the sign of the extracted peak angle is extracted.

In Step s006, the amplitudes at the positive and negative angles, that is, at the detected peak angle now being selected in the loop process and the angle obtained by reversing the sign in s005 are compared with each other. Then, the angle with the smaller amplitude is deleted, whereas the angle with the larger amplitude is left as a measured angle value of the reflecting object.

By the above-described process, when the peaks at the negative and positive angles symmetrical about approximately 0 degree are detected, the angle with the larger amplitude is selected as the measured angle value. On the other hand, when the peak is detected at one of the positive and negative angles, the detected angle is left as the measured angle value.

In the radar device according to this embodiment, the inter-channel phase variation amount $\Delta\psi m$ is required to be a given value. The inter-channel phase variation amount $\Delta\psi m$ can be obtained, for example, as follows. For the fabrication of the radar device, the reflecting object whose relative position when viewed from the radar device is known is observed to measure a difference in phase of the received signal between the channels. In this manner, the inter-channel phase variation amount $\Delta\psi m$ can be obtained in advance.

Moreover, although the embodiment employing the Fourier transform as a method of converting the signal in the channel direction into a signal in a spatial frequency domain has been described, a method of converting the signal in the channel direction into the signal in the spatial frequency domain is not particularly limited to the Fourier transform. For example, a technique such as multiple signal classification (MUSIC) conventionally known as a super-resolution technique may be used to convert the signal in the channel direction into the signal in the spatial frequency domain.

As described above, according to the first embodiment, the phase correction for a variation between the channels is performed, while the sign selecting process is performed. Therefore, even with a low-cost device configuration including receivers which generate only real signals, a target angle can be measured without any ambiguity in sign.

Second Embodiment

In the first embodiment described above, the Fourier transform is performed only in the channel direction. In the embodiment described below, the Fourier transform is also performed in a time direction.

Figure 4:
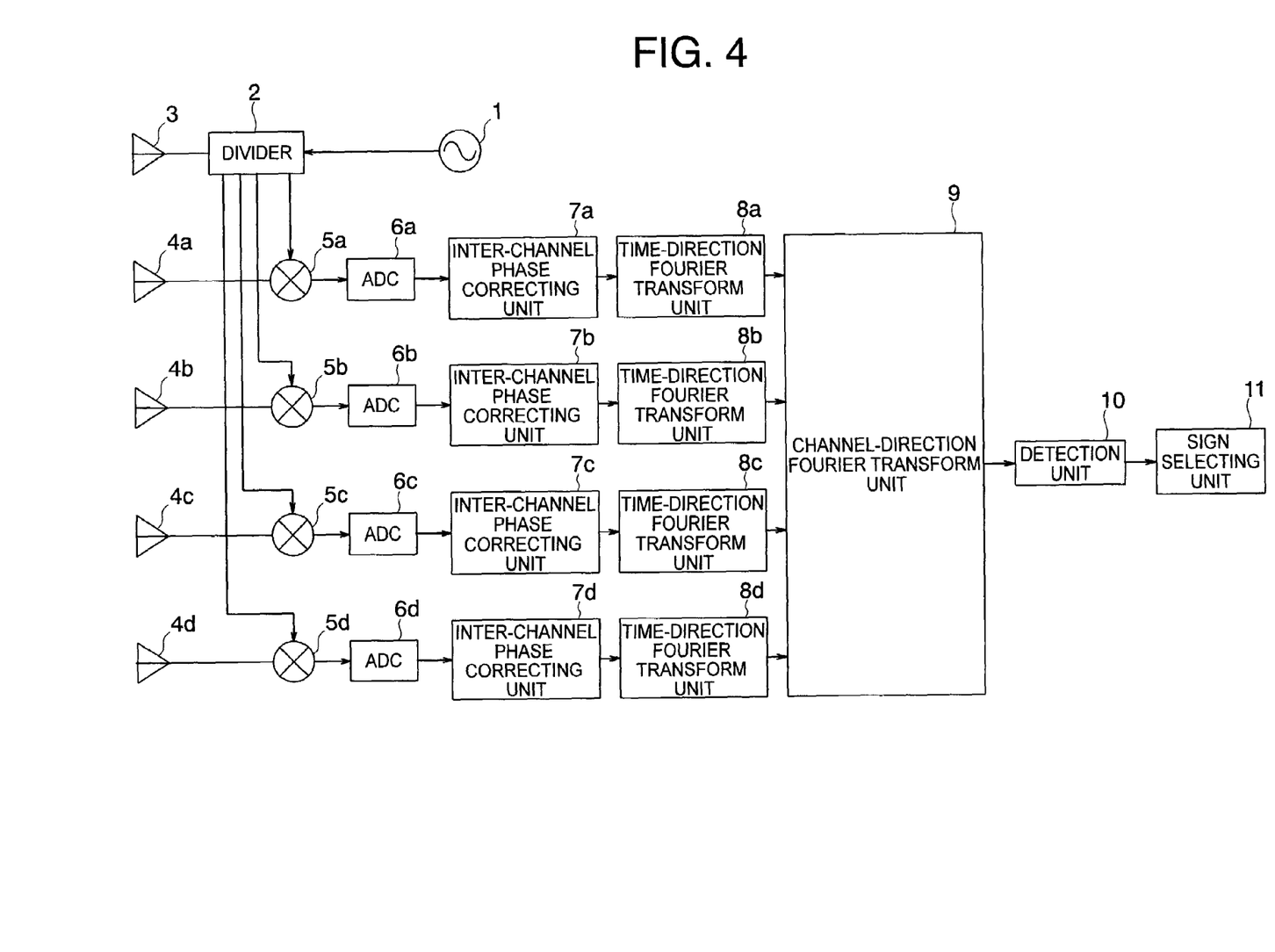
FIG. 4 is a block diagram illustrating a configuration of a radar device according to a second embodiment of the present invention.

FIG. 4 is a block diagram illustrating a configuration of a radar device according to the second embodiment of the present invention. In the configuration illustrated in FIG. 4 according to the second embodiment, the same components as those of the configuration illustrated in FIG. 1 according to the first embodiment are denoted by the same reference numerals, and the description thereof is herein omitted. The configuration illustrated in FIG. 4 according to the second embodiment differs from that illustrated in FIG. 1 according to the first embodiment in that time-direction Fourier transform units 8a to 8d are further provided between the plurality of inter-channel phase correcting units 7a to 7d and the channel-direction Fourier transform unit 9. Each of the time-direction Fourier transform units 8a to 8d performs a Fourier transform in a time direction on the phase-corrected received signal output from the corresponding one of the inter-channel phase correcting units 7a to 7d.

Next, an operation of the radar device according to the second embodiment will be described. The operation of the radar device according to the second embodiment is the same as that of the first embodiment described above up to the phase correcting process in the inter-channel phase correcting units 7a to 7d. The phase-corrected received signal output from each of the inter-channel phase correcting units 7a to 7d is input to the corresponding one of the time-direction Fourier transform units 8a to 8d. Each of the time-direction Fourier transform units 8a to 8d accumulates the phase-corrected received signals for a plurality of time instants. When a predetermined number of the phase-corrected received signals are accumulated, the time-direction Fourier transform is performed. As a result, the Fourier transform of the received signal is obtained for each channel. Because the unmodulated continuous wave is herein supposed as the transmission wave, the signal obtained after the Fourier transform exhibits a Doppler frequency distribution. Specifically, the signal obtained after the Fourier transform has a large amplitude in a Doppler frequency corresponding to a relative velocity of the reflecting object.

Next, the channel-direction Fourier transform unit 9 performs the Fourier transform in the channel direction on the time-direction Fourier transformed signal input from each of the time-direction Fourier transform units 8a to 8d. More specifically, the signals having the same Doppler frequency are extracted to be arranged in the channel direction. On the thus obtained signal string, the Fourier transform is performed. The combination of the process performed in the time-direction Fourier transform units 8a to 8d and that performed in the channel-direction Fourier transform unit 9 is equivalent to a two-dimensional Fourier transform performed on the phase-corrected received signal defined in a two-dimensional space defined by the time direction and the channel direction.

Figure 5:
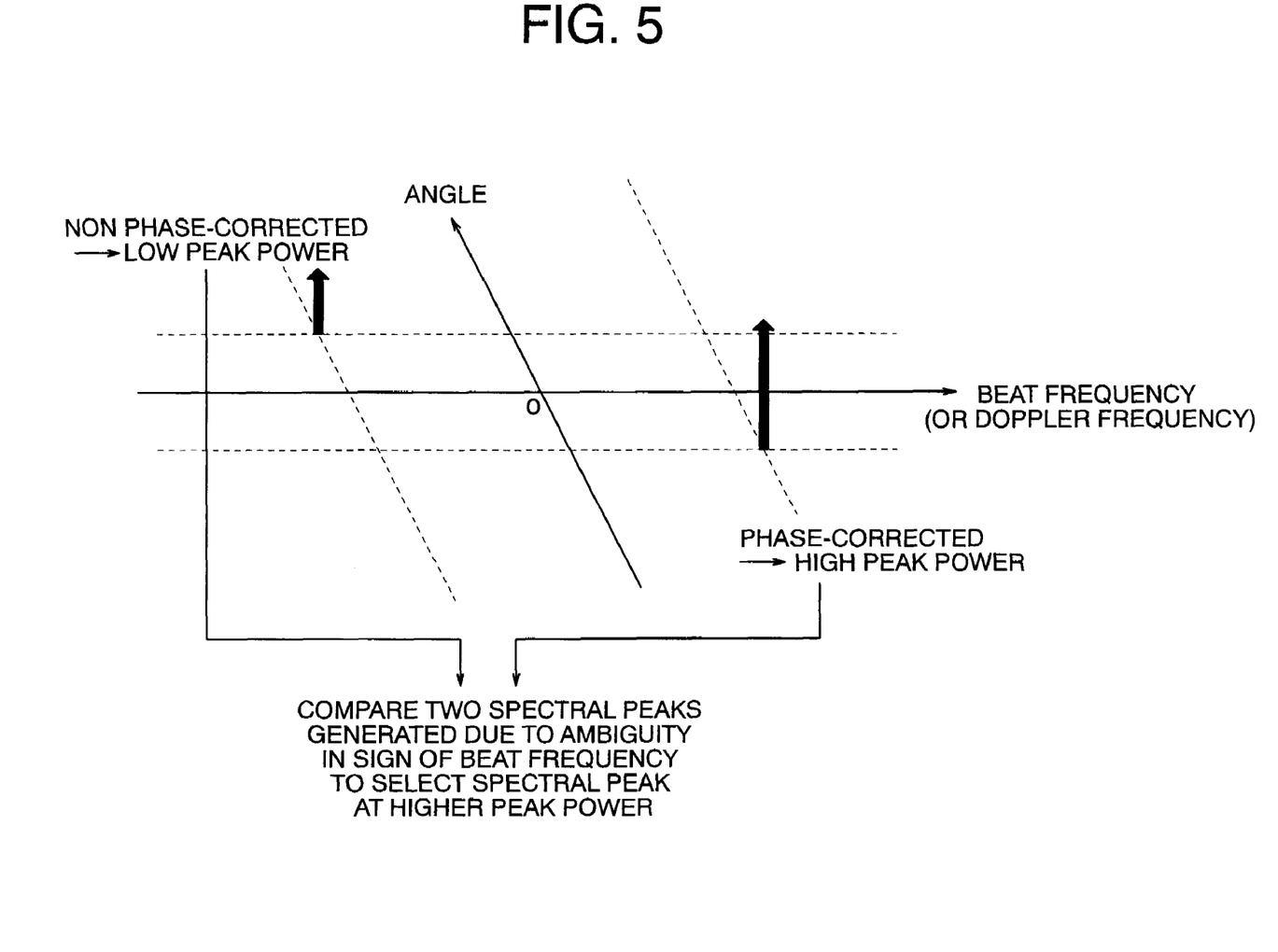
FIG. 5 is a schematic view of an example of a spatio-temporal spectrum obtained in a process of operation of the radar device according to the second embodiment of the present invention.

It is supposed that only the I-channel is obtained in each of the receivers 5a to 5d, and therefore, the received signal is a real signal. Thus, if the inter-channel phase correction is not performed, the real signal is input for the two-dimensional Fourier transform. Accordingly, an amplitude of the signal obtained after the Fourier transform, which is defined in the space defined by the frequency and the spatial frequency has a distribution symmetrical about a point of origin. For example, FIG. 5 schematically illustrates an example where one target is present. Ambiguity in sign is generated both in the Doppler frequency and the spatial frequency (angle). The ambiguity is generated as two combinations of the sign of the Doppler frequency and the sign of the spatial frequency.

However, if the phase correction is performed for an inter-channel phase variation, the phase correction is properly performed only on the combination of the Doppler frequency with the correct sign and the spatial frequency with the correct sign. The other combination of the Doppler frequency with the incorrect sign and the spatial frequency with the incorrect sign still has a variation in phase. Therefore, of two peaks in the spatio-temporal spectrum, the amplitude of the correct peak is larger than that of the incorrect peak.

Therefore, based on the above-described characteristic, the sign selecting unit 11 extracts only the signal with the correct sign from the detected spatio-temporal frequencies while removing the signal corresponding to the frequency with the incorrect sign.

Figure 6:
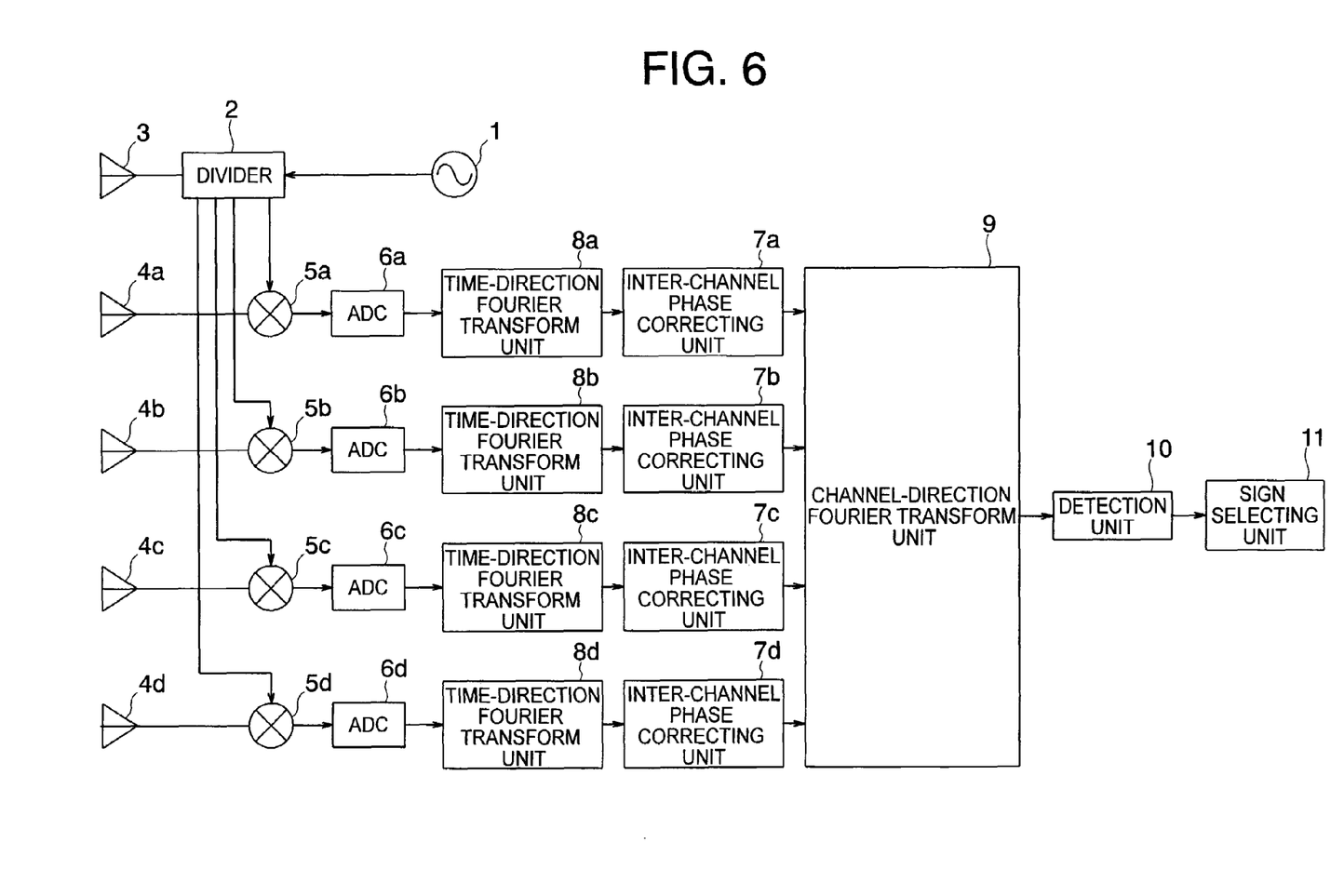
FIG. 6 is a block diagram illustrating a second example of the configuration of the radar device according to the second embodiment of the present invention.

As illustrated in FIG. 4, the time-direction Fourier transform units 8a to 8d are provided at the subsequent stage of the inter-channel phase correcting units 7a to 7d. However, the time-direction Fourier transform is a process closed for each channel. Therefore, even when the time-direction Fourier transform units 8a to 8d are provided at the previous stage of the inter-channel phase correcting units 7a to 7d as illustrated in FIG. 6, the effect equivalent to that obtained in FIG. 4 can be obtained.

Moreover, in the configuration illustrated in FIG. 4, the time-direction Fourier transform and the channel-direction Fourier transform are performed separately in the time-direction Fourier transform units 8a to 8d and the channel-direction Fourier transform unit 9. However, even when a spatio-temporal Fourier transform unit 12 is provided as a two-dimensional Fourier transform unit in place of the time-direction Fourier transform units 8a to 8d and the channel-direction Fourier transform unit 9 to simultaneously perform the time-direction Fourier transform and the channel-direction Fourier transform, the effect equivalent to that of the radar device having the configuration illustrated in FIG. 4 can be obtained.

Figure 8:
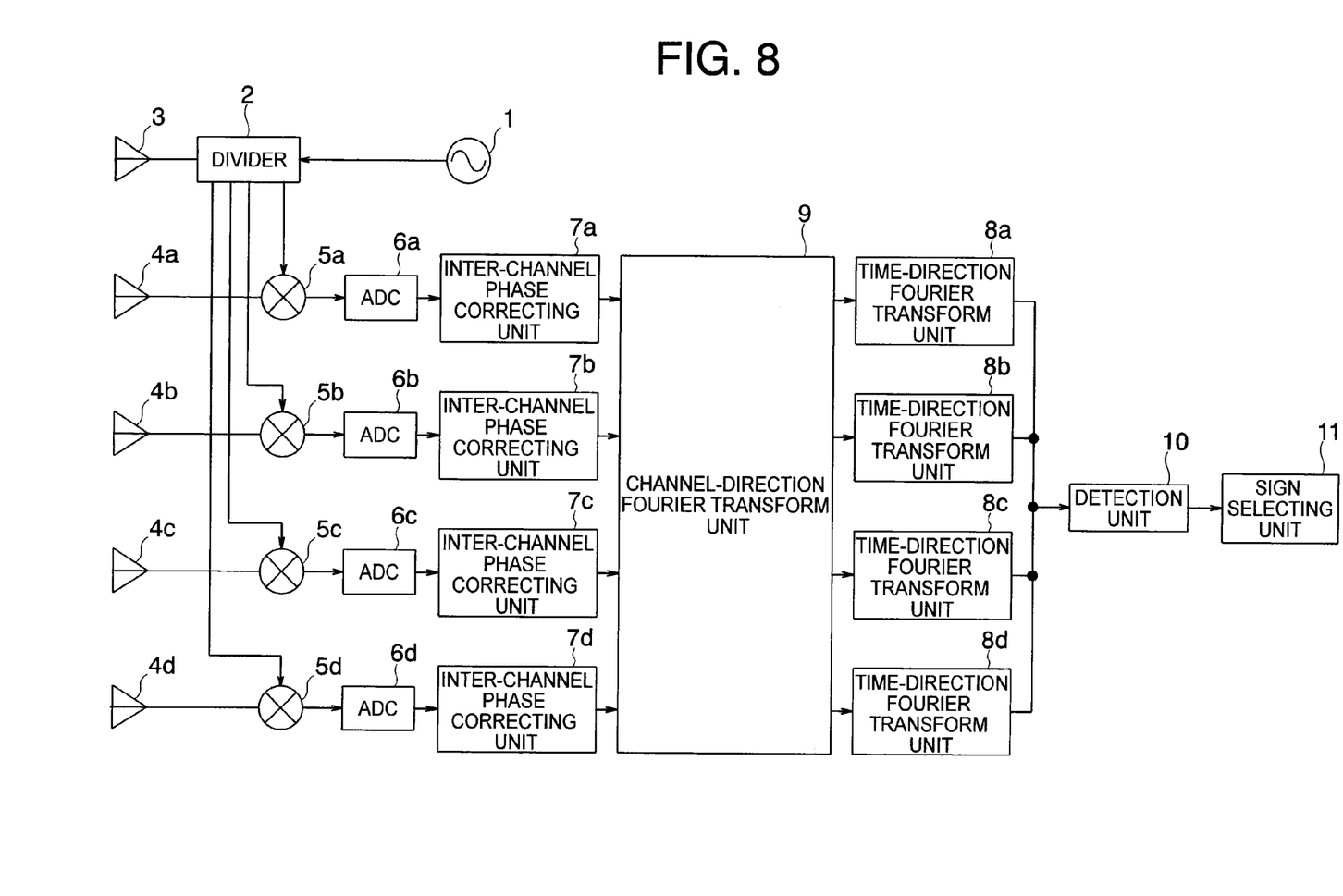
FIG. 8 is a block diagram illustrating a fourth example of the configuration of the radar device according to the second embodiment of the present invention.

Furthermore, in the configuration illustrated in FIG. 4, the channel-direction Fourier transform unit 9 is provided subsequent to the time-direction Fourier transform units 8a to 8d to perform the channel-direction Fourier transform after the time-direction Fourier transform. Instead, even with a configuration including the Fourier transform units arranged in the different order, specifically, with a configuration including the time-direction Fourier transform units 8a to 8d provided subsequent to the channel-direction Fourier transform unit 9 to perform the time-direction Fourier transform after the channel-direction Fourier transform as illustrated in FIG. 8, the effect equivalent to that of the radar device having the configuration illustrated in FIG. 4 can be obtained.

As described above, according to the second embodiment, the inter-channel phase variation is corrected while the signal selecting process is performed. Therefore, even with a low-cost device configuration including receivers which generate only real signals, the Doppler velocity and the angle of a target can be measured without any ambiguity in sign.

Third Embodiment

In the above-described embodiments, an inter-channel phase variation generated in the fabrication process or due to a change with time is corrected to solve the problem of ambiguity in sign in the measurement. However, when the radar device can be fabricated with high accuracy and a change with time can be estimated to be small, it is conceivable to give an inter-channel phase variation in advance to design and fabricate the radar device. Such an embodiment will now be described below.

Figure 9:
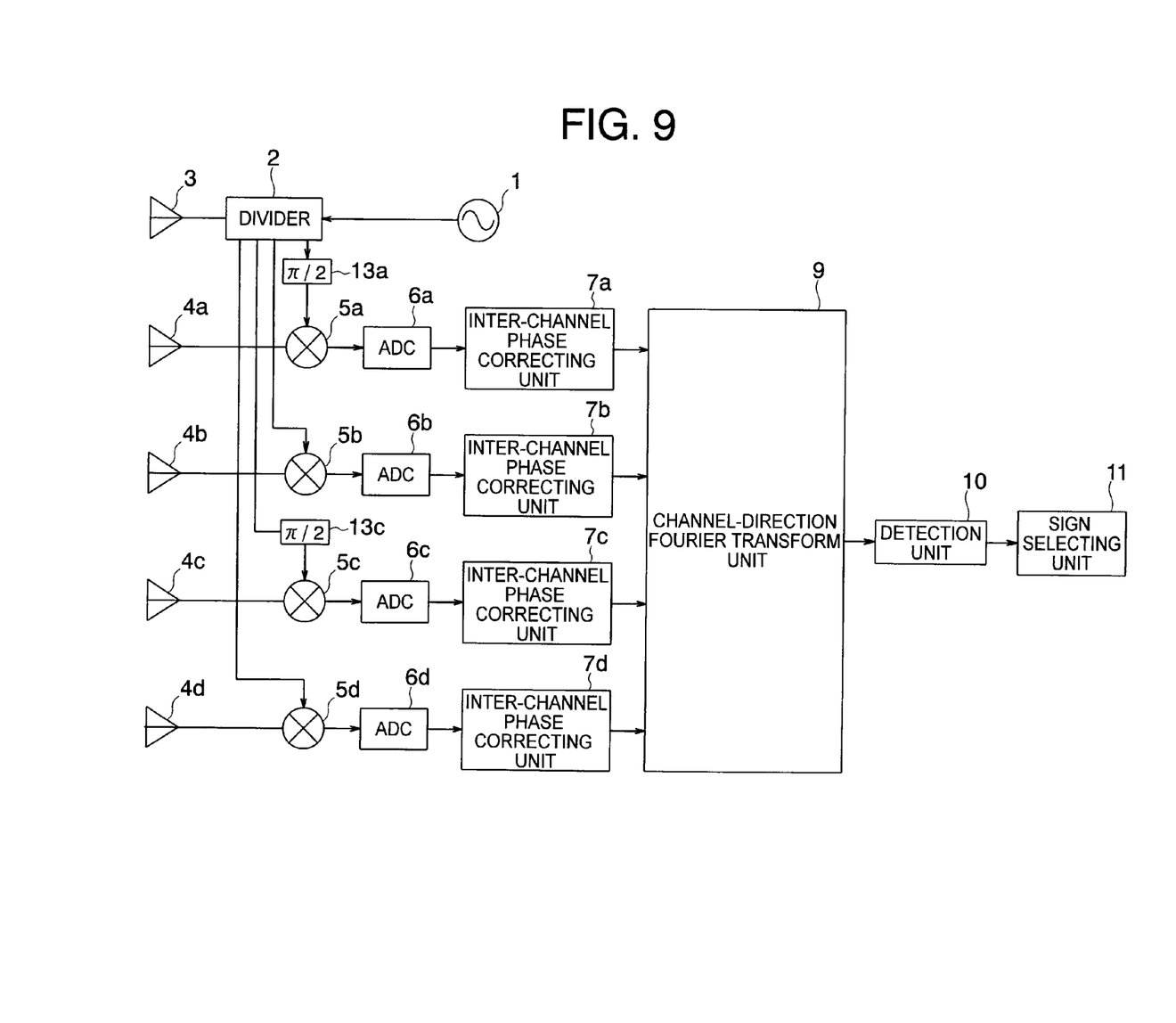
FIG. 9 is a block diagram illustrating a configuration of a radar device according to a third embodiment of the present invention.

FIG. 9 is a block diagram illustrating a configuration of a radar device according to a third embodiment of the present invention. In the configuration illustrated in FIG. 9 according to the third embodiment, the same components as those of the configuration illustrated in FIG. 1 according to the first embodiment are denoted by the same reference numerals, and the description thereof is herein omitted. The third embodiment illustrated in FIG. 9 differs from the first embodiment illustrated in FIG. 1 in that phase shifters 13a and 13c are further provided. Each of the phase shifters 13a and 13c rotates the phase of a signal by $\pi/2$.

Next, an operation of the radar device according to the third embodiment will be described. The operation of the radar device illustrated in FIG. 9 is almost the same as that of the radar device illustrated in FIG. 1 above. However, it is assumed that there is no variation in phase between the received waves input to the receivers 5a to 5d. Specifically, when the received waves come from a front direction of the radar device, the phases at the input terminals of the receivers 5a to 5d are identical between the channels. Instead, the phase of the output of the transmission wave to be mixed with the received wave differs between the channels. As a result, a variation is generated in phase between the received signals output from the receivers 5a to 5d.

The phase of the output of the transmission wave is rotated by each of the phase shifters 13a and 13c. The transmission wave components are output from the divider 2 to the receivers 5a to 5d. Only the transmission wave components input to the receivers 5a to 5c are phase-rotated by the phase shifters 13a and 13c, respectively. As the amount of phase rotation, a phase rotation of $\pi/2$ is given. As a result, the phase of the received signal at the output terminal of each of the receivers 5a and 5c is rotated by $\pi/2$, as compared with the state where the signal has no variation in phase.

The phase rotation is corrected by the inter-channel phase correcting units 7a to 7d. The phase correction is correctly performed only on the signal component having the spatial frequency with the correct sign. On the other hand, the signal component having the spatial frequency with the incorrect sign generated due to ambiguity in sign still has a variation in phase.

The signal component having the spatial frequency with the incorrect sign has a characteristic that the amount of a variation in phase is doubled as expressed by Formula (9) above. Therefore, the phase shift of $\pi/2$ given in advance is doubled to be $\pi$ after the phase correction process. Specifically, the phase is inverted. Thus, because the component having the spatial frequency with the incorrect sign is eliminated in the coherent integration process with the channel-direction Fourier transform, the amplitude is reduced after the integration. Specifically, the signal of the spatial frequency has little ambiguity in sign.

In practice, however, there is a possibility that the signal component having the spatial frequency with the incorrect sign is not sufficiently eliminated. For example, such a problem may happen due to the effect of a random variation in phase. Even in such a case, as in the case of the first embodiment, the component with the incorrect sign can be removed by the sign selecting unit 11.

In the above description, each of the phase shifters 13a and 13c provides a phase difference of $\pi/2$. However, if the phase difference is a given value, the phase difference is not necessarily required to be equal to $\pi/2$. In this case, although the degree of suppression on the component having the spatial frequency with the incorrect sign is lowered, the component with the incorrect sign can be removed by the sign selecting unit 11, as in the case of the first embodiment.

Figure 10:
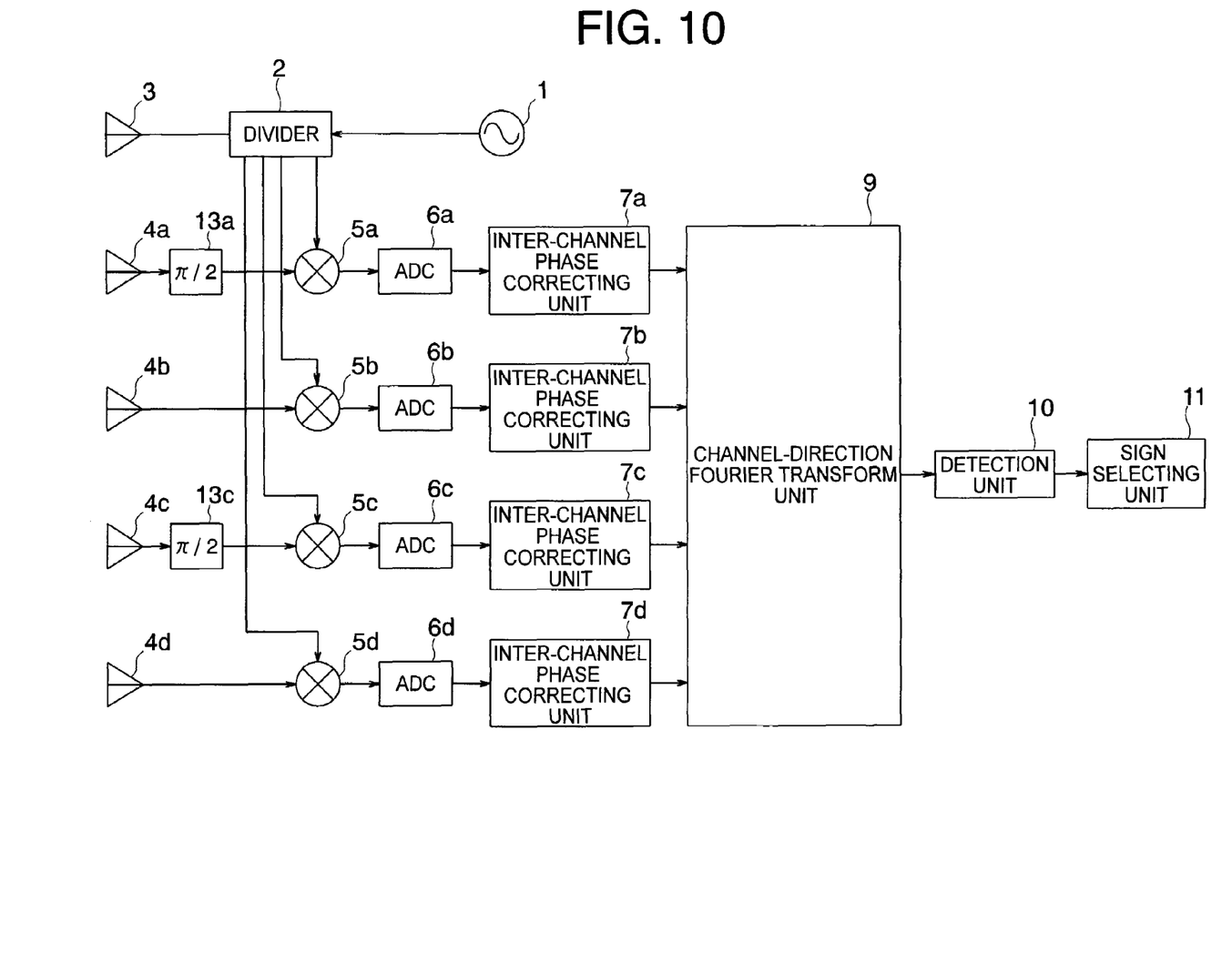
FIG. 10 is a block diagram illustrating a second example of the configuration of the radar device according to the third embodiment of the present invention.

Moreover, in FIG. 9, each of the phase shifters 13a and 13c shifts the phase of the transmission wave (local signal) by $\pi/2$. Alternatively, as illustrated in FIG. 10, the phase shifters 13a and 13c may be provided between the receiving antenna 4a and the receiver 5a, and the receiving antenna 4c and the receiver 5c, respectively, to rotate the phase of the received wave by $\pi/2$. Even with such a configuration, the same effects as those obtained with the configuration illustrated in FIG. 9 can be obtained. As a specific mode, besides the arrangement of the phase shifters between the receiving antennas and the receivers, a phase difference may be generated by simply changing an electrical path length of the power feeding path.

Figure 7:
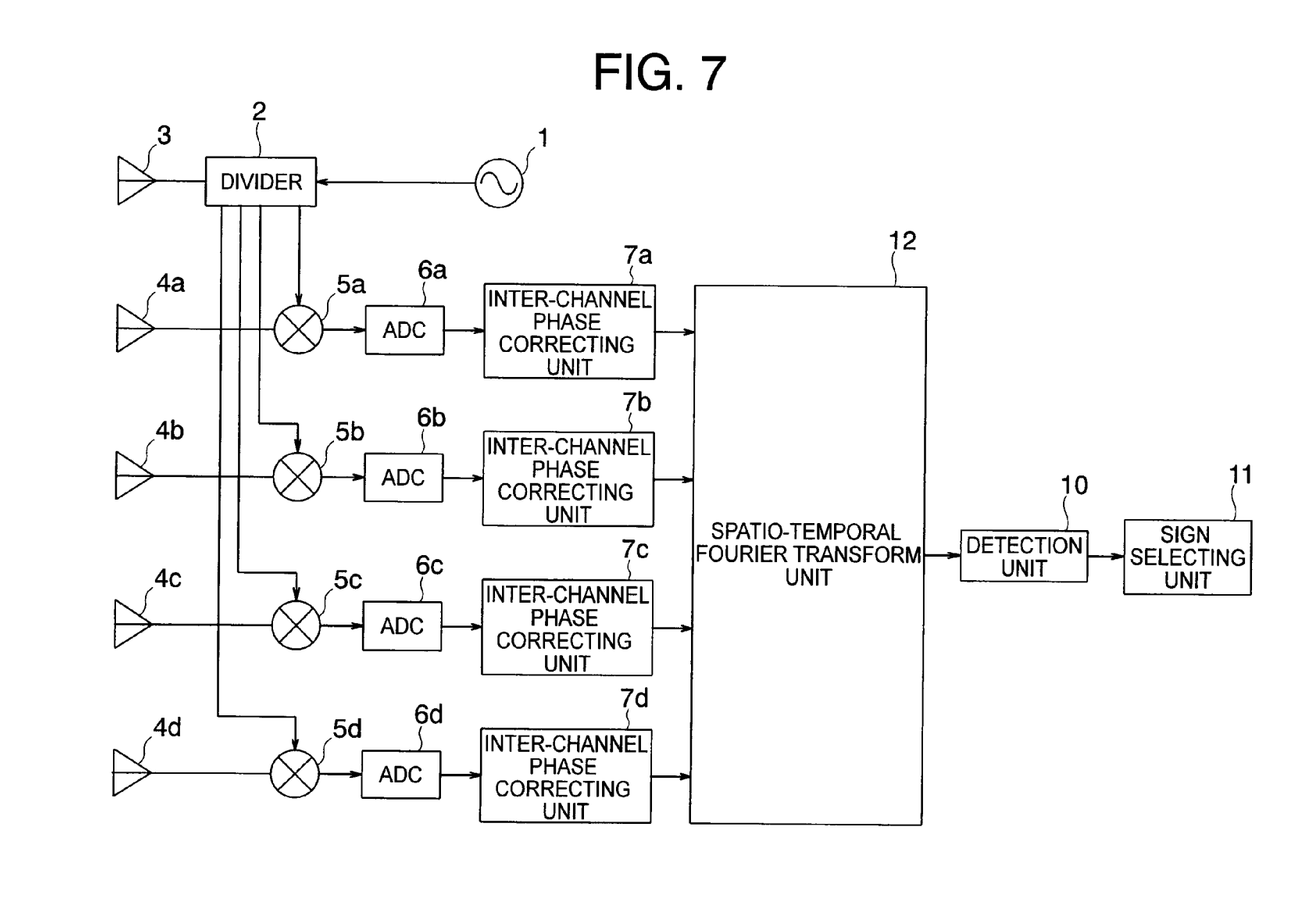
FIG. 7 is a block diagram illustrating a third example of the configuration of the radar device according to the second embodiment of the present invention.

Furthermore, although the configuration for performing the Fourier transform only in the channel direction has been illustrated in FIGS. 9 and 10, the Fourier transform can be performed in the time direction as well as in the channel direction as illustrated in FIGS. 4, 6 and 7. With such a configuration, the same effects as those obtained in the second embodiment described above can be obtained.

What is claimed is:

1. A radar device for emitting a wave into space, receiving the wave reflected by an object present in the space, and performing signal processing on the received wave to measure the object, comprising:
   an oscillator for generating the wave;
   a transmitting element for emitting the wave generated in the oscillator into the space;
   a local wave extracting unit for extracting a part of the wave generated in the oscillator to output the part of the wave as a local wave;
   a plurality of receiving elements provided at positions different from each other, for receiving an incoming wave and outputting the received wave;
   a plurality of receivers each using the local wave output from the local wave extracting unit to detect the received wave received by each of the plurality of receiving elements to generate a real received signal;
   a plurality of inter-channel phase correcting units for multiplying the real received signal obtained by each of the plurality of receivers by a phase correction factor different for each of the plurality of receivers, the phase correction factor being represented by a complex number;
   a spatial frequency information generating unit for converting a received signal string obtained by gathering phase-corrected received signals output from the plurality of inter-channel phase correcting units into a signal in a spatial frequency domain; and
   a sign selecting unit for selecting a signal having a larger amplitude in a spatial frequency spectrum when two signals from a positive direction and a negative direction which are symmetrical with respect to a direction at 0 degree are detected in the spatial frequency information generating unit.

2. The radar device according to claim 1, further comprising a plurality of time-direction Fourier transform units between the plurality of inter-channel phase correcting units and the spatial frequency information generating unit, for performing Fourier transform on the phase-corrected received signal in a time axis direction,
   wherein the spatial frequency information generating unit converts the received signal string obtained by gathering a plurality of Fourier-transformed signals from the plurality of time-direction Fourier transform units in an amount corresponding to the plurality of receivers into the signal in the spatial frequency domain, and
   wherein the sign selecting unit selects the signal having a larger amplitude when two signals in the positive direction and the negative direction symmetrical with respect to the direction at 0 degree, which have a positive frequency and a negative frequency symmetrical to each other, are detected.

3. The radar device according to claim 1, further comprising a plurality of time-direction Fourier transform units between the plurality of receivers and the plurality of inter-channel phase correcting units, for performing Fourier transform on the real received signal obtained in each of the plurality of receivers in a time axis direction,
   wherein each of the plurality of inter-channel phase correcting units multiplies the Fourier-transformed signal from each of the plurality of time-direction Fourier transform units by the phase correction factor represented by the complex number,
   wherein the spatial frequency information generating unit converts the received signal string obtained by gathering a plurality of Fourier-transformed signals from the plurality of time-direction Fourier transform units in an amount corresponding to the plurality of receivers into the signal in the spatial frequency domain, and wherein the sign selecting unit selects the signal having a larger amplitude when two signals in the positive direction and the negative direction symmetrical with respect to the direction at 0 degree, which have a positive frequency and a negative frequency symmetrical to each other, are detected.

4. The radar device according to claim 1, further comprising a plurality of time-direction Fourier transform units between the spatial frequency information generating unit and the sign selecting unit, for performing Fourier transform on the signal in the spatial frequency domain obtained in the spatial frequency information generating unit for each frequency in a time axis direction, wherein the sign selecting unit selects the signal having a larger amplitude when two signals in the positive direction and the negative direction symmetrical with respect to the direction at 0 degree, which have a positive frequency and a negative frequency symmetrical to each other, are detected.

5. The radar device according to claim 1, wherein at least a half of the plurality of receivers is fed with power so that a phase of a local wave to be input thereto is shifted by 90 degrees as compared with that of a local wave to be input to the other one of the plurality of receivers.

6. The radar device according to claim 5, wherein the at least a half of the plurality of receivers and the local wave extracting unit have a phase shifter for rotating the phase of the signal by 90 degrees provided therebetween.

7. The radar device according to claim 5, wherein the phase of the signal is shifted by 90 degrees by changing an electrical path length of a power feeding line between the at least a half of the plurality of receivers and the local wave extracting unit.

8. The radar device according to claim 1, wherein at least a half of the plurality of receivers is fed with power so that a phase of the received wave to be input thereto is shifted by 90 degrees as compared with that of the received wave to be input to the other one of the plurality of receivers.

9. The radar device according to claim 8, wherein the at least a half of the plurality of receivers and at least a half of the plurality of receiving elements have a phase shifter for rotating the phase of the signal by 90 degrees provided therebetween.

10. The radar device according to claim 8, wherein the phase of the signal is shifted by 90 degrees by changing an electrical path length of a power feeding line between the at least a half of the plurality of receivers and at least a half of the plurality of receiving elements.

11. A radar device for emitting a wave into space, receiving the wave reflected by an object present in the space, and performing signal processing on the received wave to measure the object, comprising:

an oscillator for generating the wave;

a transmitting element for emitting the wave generated in the oscillator into the space;

a local wave extracting unit for extracting a part of the wave generated in the oscillator to output the part of the wave as a local wave;

a plurality of receiving elements provided at positions different from each other, for receiving an incoming wave and outputting the received wave;

a plurality of receivers each using the local wave output from the local wave extracting unit to detect the received wave received by each of the plurality of receiving elements to generate a real received signal;

a plurality of inter-channel phase correcting units for multiplying the real received signal obtained by each of the plurality of receivers by a phase correction factor different for each of the plurality of receivers, the phase correction factor being represented by a complex number;

a spatio-temporal Fourier transform unit for performing two-dimensional Fourier transform on a phase-corrected received signal output from each of the plurality of inter-channel phase correcting units in a time axis direction as well as in a receiving element direction; and a sign selecting unit for selecting a signal having a larger amplitude when two signals in a positive direction and a negative direction symmetrical with respect to a direction at 0 degree, which have a positive frequency and a negative frequency symmetrical to each other, are detected in the spatio-temporal Fourier transform unit.

* * * * *